United States Patent

[11] 3,614,591

| | | | | | | |
|---|---|---|---|---|---|---|
| [72] | Inventor | James L. Brown<br>Marion, Iowa | | 3,139,562 | 6/1964 | Freeborn...................... 307/235 X |
| [21] | Appl. No. | 23,151 | | 3,228,002 | 1/1966 | Reines......................... 307/235 |
| [22] | Filed | Mar. 27, 1970 | | 3,317,753 | 5/1967 | Mayhew....................... 307/235 X |
| [45] | Patented | Oct. 19, 1971 | | 3,311,753 | 3/1967 | Nelson ......................... 307/235 X |
| [73] | Assignee | Collins Radio Company<br>Cedar Rapids, Iowa | | 3,518,453 | 6/1970 | Hoffman et al............... 307/240 |

Primary Examiner—William M. Shoop, Jr.
Attorneys—Richard W. Anderson and Robert J. Crawford

[54] FAILSAFE AND-MONITOR CIRCUIT
11 Claims, 1 Drawing Fig.

[52] U.S. Cl..................................................... 321/16,
307/235, 321/18, 324/140, 328/158
[51] Int. Cl...................................................... H02m 1/08,
G06g 7/00
[50] Field of Search........................................... 307/231,
235, 240; 324/140; 328/158; 340/253; 321/16, 18

[56] References Cited
UNITED STATES PATENTS
3,026,505   3/1962   Bevilacqua.................... 328/158 X
3,037,151   5/1962   Cimerman et al. ........... 324/140 X ABSTRACT: A circuitry which develops an output of a predetermined DC polarity in response to all of a plurality of input lines exhibiting voltage levels in excess of a threshold level. Should at least one of the input lines fall beneath threshold or the monitoring circuitry itself fail a second output level of opposite polarity is developed. The monitored inputs act as supply voltages for a transistor switching chain to which a square wave tracer input is applied. The output from the chain is a square wave at the tracer PRF only if the circuitry is operational and the inputs are above threshold. Output circuitry is responsive only to a square wave applied from the chain to develop the output level assigned to indicate valid output logic.

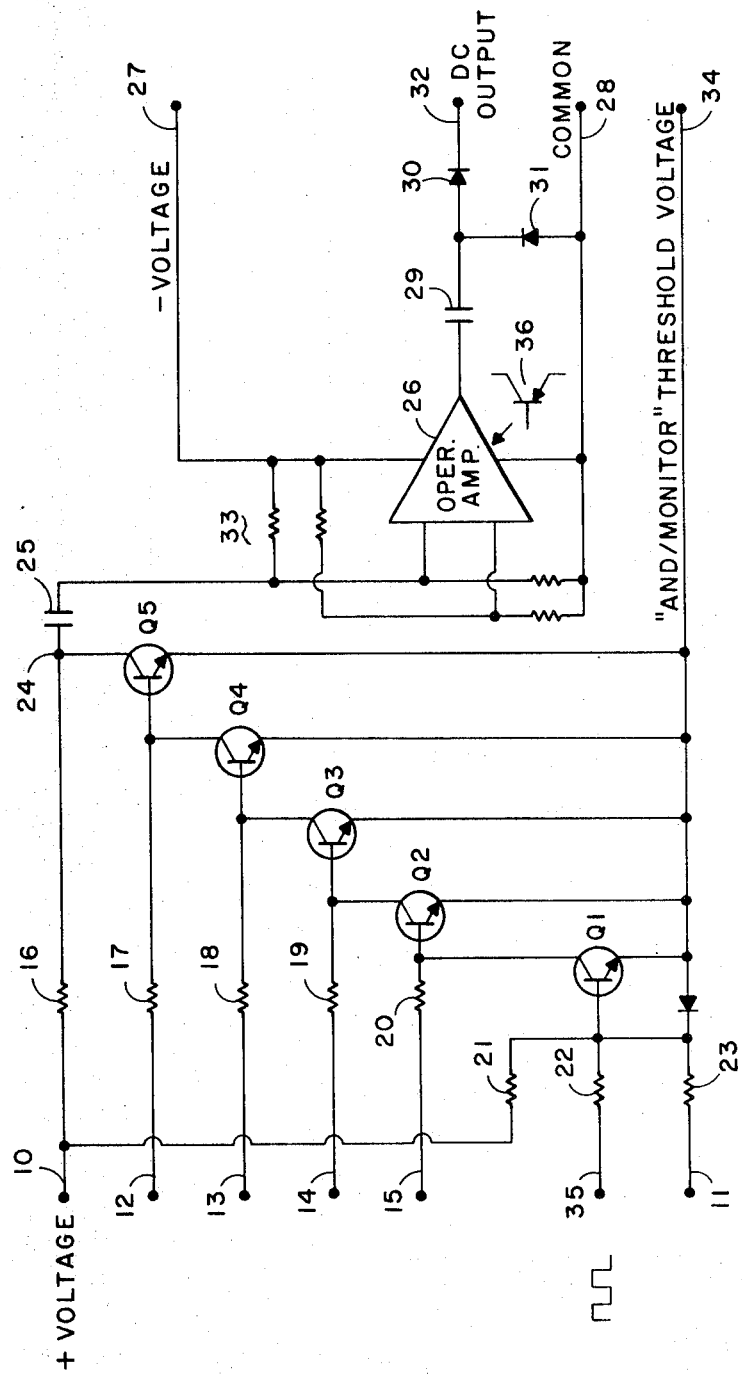

FAILSAFE AND-MONITOR CIRCUIT

This invention relates generally to voltage monitoring circuitries and more particularly to a combination AND gate-failsafe monitor for a plurality of input lines which will provide a logically "gool" output indication in the form of a predetermined DC voltage level of given polarity only when each of the plurality of monitor input line voltages exhibits a voltage magnitude in excess of a predetermined threshold and providing that the monitoring circuitry per se does not exhibit an operational failure. Conversely, the present invention provides a distinguishably different logic output of substantially zero or opposite polarity should any one of the monitored input line voltages fall beneath the threshold level or a portion of the monitoring circuitry per se exhibit an operational failure. The circuitry is failsafe in that no operational failure in the circuitry can cause a valid output to be generated.

The present invention finds special usage for monitoring the outputs from one or more voltage comparators, for example, or any other monitoring signals (the DC level of which exhibits a logically operational condition) into a single failsafe output. For example, in automatic flight control apparatus control signals might be redundantly computed and logic circuitry provided by means of which various combinations of redundantly computed signals may be compared—with the output of the comparators being applied to control logic means to effect particular modes of control operation.

A failsafe monitoring circuitry cannot be definition incorporate a design feature wherein a failure of the monitoring circuitry itself will exhibit an output logic indication or level which cannot be distinguished from the level defined as indicating a valid output. Should such monitoring devices employ transistor switching arrangements wherein an output transistor is caused to be fully saturated or cut off depending upon the presence or absence of each of a plurality of monitored inputs, a failure in the transistor output device and/or its associated circuitry might exhibit an output indistinguishable from that reserved for an operational valid output. Obviously, if circuitries exhibit this peculiarity, the output level which supposedly indicates all input monitored signals are proper might in fact result from an operational failure within the monitor itself. Such a circuit is obviously unreliable and could in critical aircraft control signal development lead to catastrophic results.

Accordingly the present invention provides an arrangement to combine or "AND" the outputs as from one or more failsafe comparators or from other monitoring sources into a single failsafe output. The design of the circuitry is such that no internal component failure in the monitoring circuitry per se can cause the device to produce a valid output, nor can a valid output be generated if any one of the inputs is invalid.

A further object of the present invention is to provide a failsafe AND/monitor circuit by means of which a basic circuitry arrangement can be extended in a cascadelike arrangement to permit monitoring in a failsafe manner of any number of inputs without limitation.

The invention is featured in the provision of a "chain" of transistor switching elements each of which is associated with a particular input line as well as being interconnected in a controlling manner with preceding and succeeding ones of the elements in the "chain." Each input line to be monitored acts as a drive for the associated transistor switch and as a DC supply voltage for the preceding one of the elements in the "chain." The cascaded switch arrangement functions as an ANDing operation by means of which an output terminal exhibits a signal of a first discrete characteristic only if all switches are operational and all monitored inputs are within specification. Absence or failure in any one of these respects causes the output of the terminal to exhibit a characteristically different and readily distinguishable signal. An ensuing output circuitry is responsive only to signals of the first characteristic to generate an output signal of predetermined polarity which is defined as a valid output.

These and other features and objects of the present invention will become apparent upon reading the following description with reference to the accompanying drawing in which the single FIG. is a schematic diagram of an embodiment of the failsafe AND/monitor circuit of the invention.

The circuitry of the present invention is designed to monitor and combine one or more DC signals into a single failsafe output which will be predictable when any one of the DC inputs is below a predetermined threshold or in case of an internal component failure in the monitor circuitry per se. The circuit of the present invention is expandable to accommodate any predetermined number of DC inputs.

In general the inputs to be monitored are applied to associated transistor switching elements in a fashion as though the inputs were DC supply voltages for the associated transistor stage. The transistor stages are interconnected such that each of the transistors is effective when conductive to remove the base drive from a succeeding one of the transistors in the chain. Thus when any one of the DC input voltages to be monitored drops below a predetermined threshold voltage, there is insufficient drive to turn on the associated transistor switching element. A switching control signal of, for example, 10 kHz. is injected to control the conduction of a further switching element which precedes the first input line associated element in the "chain." The switching signal which might be in the form of a pulsating square wave, acts as a carrier of sorts which depends upon the DC levels at the monitoring input for "propagation" to an output terminal. In general operation, the circuitry provides an output signal fluctuating between predetermined voltage levels at a rate determined by the repetition rate of the injected switching signal only when all of the monitored DC inputs are within tolerable levels and all associated circuitry is operational. In the absence of any one of these necessary conditions the output remains at a fixed voltage level. This output signal, exhibiting one of two readily distinguishable characteristics, is applied to output circuitry which is responsive only to a variable level input signal to generate a valid output indication. The valid output is a predetermined positive DC output level. A second predetermined output level of zero to opposite polarity is generated in response to an invalid situation. The circuitry, as will be further described, is designed such that component failure in any part of the circuitry cannot cause a valid output to be generated. Thus, the presence of a valid output from the failsafe AND/monitor circuit of the present invention assures that the plurality of input lines being monitored are all within tolerance and, in addition, the monitoring circuitry per se is operational.

For the purpose of the following description the following definitions will be in effect:

1. Failsafe: no single internal component failure may cause a valid output when one or more of the DC inputs are invalid. In other words, there will be no positive output if there is an internal failure or loss of a DC input.

2. Output valid: the voltage output level is above a specific DC value.

3. Output invalid: the voltage output level is below a specific value.

4. AND/monitor inputs valid: the DC voltage input levels are above a predetermined value.

5. AND/monitor inputs invalid: the DC voltage input levels are below a specific threshold value.

6. Switching signal input valid: the signal inserted is between a predetermined peak-to-peak value.

7. Switching signal input invalid: the signal input is inadequate for proper switching control and lies below a predetermined peak-to-peak level.

The following component part failure modes are considered in determining if the circuit is failsafe:

| ELEMENT PARTS | MODES OF FAILURE |
| --- | --- |
| Resistors | Open |
| Capacitors | Open |
| | Short |
| Diodes | Open |
| | Short |
| Transistors | Increased $I_{CBO}$ by 10 |
| | Increased $I_{EBO}$ by 10 |
| | Decreased $h_{fe}$ by ½ |
| | Collector-emitter short |
| Operational Amplifier | Open input |
| | Loss of output |

With reference to the figure, a failsafe AND/monitor circuit embodiment in accordance with the present invention is depicted which monitors four DC input lines 12, 13, 14, and 15. These lines might be the outputs from four different voltage comparators in a logic comparison system or any other source of four voltages the level of which is defined as being valid when the level exceeds a predetermined DC voltage. Input line 12 is applied through resistor 17 to the base of a transistor Q5, line 13 is applied through a resistor 18 to the base of a transistor Q4, line 14 is applied through a resistor 19 to the base of a transistor Q3, and line 15 is applied through a resistor 20 to the base of a transistor Q2. A positive DC voltage source 10 is supplied through a resistor 16 to terminal 24 connected to the collector of the uppermost transistor Q5. The positive voltage source 10 is additionally applied through a resistor 21 to the base of a switching or control transistor Q1 in the lower portion of the diagram. The base of transistor Q1 is additionally applied through a resistor 23 to a negative supply voltage source 11 and through a resistor 22 to a source of input switching voltage. The switching voltage might be in the form of a relatively high frequency square wave such as one varying from 0 to a predetermined positive voltage at a 10 kHz. rate. The switching signal applied to input terminal 35 alternately switches transistor Q1 on and off provided the DC monitored input on terminal 15, as applied through resistor 20 to the collector of transistor Q1, is above the threshold voltage value defined by the potential of line 34 to which the emitter of transistor Q1 is returned. When the monitored DC input voltage on line 15 is above the threshold voltage, the application of switching signal on terminal 35 to the base of transistor Q1 periodically drives transistor Q1 into conduction. During the conductive periods of Q1 at the switching rate the base drive to transistor Q2 is shorted.

The overall operation of the cascaded chain of switching transistors Q1 through Q5 might best be described from an operational standpoint by considering that each of the monitored DC input voltages 12, 13, 14, and 15 applied to the bases of the associated transistors is above the predetermined threshold value. In this instance the operation of the transistor chain Q1–Q5 may be defined as follows. Considering the periods during which transistor Q1 is rendered conductive by the switching input signal on line 35, the following sequence is effected.

Transistor Q1, in being conductive, shorts the base drive to transistor Q2. When Q2 is nonconducting, transistor Q3 is in a conductive state since its base drive from input terminal 14 is effected and the base drive of transistor Q4 is shorted by the conductive transistor Q3. Q4, in being rendered nonconductive, permits transistor Q5 to be rendered conductive which in turn drives the collector potential on terminal 24 of the collector of transistor Q5 to a low level.

Now considering the alternate periods during which the switching transistor Q1 is rendered nonconductive, with Q1 nonconductive, Q2 is conductive to short the base drive of transistor Q3. Transistor Q3, in being rendered nonconductive, permits transistor Q4 to be conductive to short the base drive of transistor Q5. Q5, in therefore being rendered nonconductive, results high level collector potential at terminal 24. Thus under the situation of each of the transistors Q1 through Q5 being operative and each of the four depicted monitored DC inputs being above threshold value, the circuitry develops at the collector of Q5 (terminal 24) a square wave varying between two discrete voltage levels and at a rate defined by the pulse repetition frequency of the input switching signal applied to the base of transistor Q1 through input terminal 35.

The proper operation of the transistor switching chain in the presence of valid above threshold inputs on the monitoring input lines 12 through 15 thus effectively "transmits" the switching signal applied to input terminal 35 at the 10 kHz. rate to terminal 24. Should any one of the input lines 12 through 15 fall beneath threshold value, the "transmission" sequence is broken and the output terminal 24, that is the collector potential of the transistor Q5, remains at a fixed voltage level rather than alternately switching between first and second levels.

Similarly, should the input switching signal on terminal 35 deviate from nominal and thus be ineffective in alternately rendering transistor Q1 nonconductive, or any one of the succeeding transistors in the chain be inoperative, the "transmission" sequence is interrupted and the output terminal 24 remains at a fixed level.

As will be further described, the succeeding output circuitry of the monitoring circuit is responsive only to a periodic variations in voltage level at terminal 24 to develop a "valid" DC output on output terminal 32. Thus the failsafeness feature of the circuitry as described thus far is seen to meet the prerequisites, namely, that all monitored inputs be valid, that the supply voltages for the transistor switching chain be present, and that each of the transistors be operative. Failure of any one of these conditions results in a fixed DC level on collector of transistor Q5 from the switching chain.

This operation might be further explained by considering that the input monitored signal on line 15 to the base of transistor Q2 falls beneath threshold. Under this condition the base drive on transistor Q2 is insufficient to turn Q2 on. Q2 remains in a static conductive state as do the succeeding transistors in the chain, transistors Q3 through Q5, since their base drive is not altered by transistor Q2 which remains in a given conductive state. Therefore, the output transistor of the switching chain, transistor Q5, exhibits a collector voltage which does not change. In response to this situation the ensuing output circuitry does not provide the prescribed DC output level which defines a valid condition. Similarly, should the input switching AC signal on terminal 35 be ineffectual in switching transistor Q1 from alternate conductive to nonconductive states, there is no change in the conductive state in the succeeding transistors in the chain and again the collector voltage of the transistor Q5 remains at a static voltage level. By a similar analysis, when any one of the monitored DC inputs on lines 12–15 falls beneath threshold, the sequence in the switching "chain" is interrupted and output transistor Q5 exhibits a static collector voltage.

It might be noted at this point that the circuitry thus far described exhibits the same characteristic regardless of the number of monitored input signals. Four such monitored input signals and their associated transistors Q2 through Q5 are illustrated in the figure. Any number of input may be monitored, the requirement being that each is connected in circuit through an associated transistor with appropriate interconnection to the proceeding and succeeding transistors in the chain. Further whether the number of monitored inputs is odd or even exhibits no effect on the operational characteristic. An analysis of the switching sequence considering all valid monitored inputs would indicate that an odd number of monitored inputs and associated transistor switches would result in one particular phase relationship of the periodic varying collector voltage on the output transistor Q5 while an even number of monitored inputs would exhibit an opposite phase relationship of the voltage on line 24 with respect to the input switching signal 35. The output circuitry to be further described is not effected by the particular phase of the varying DC level defining the voltage at terminal 24—rather it operates purely on whether the voltage at terminal 24 is periodically varying between two discrete DC levels or remains at a fixed or static level. It is to be emphasized that any number of monitored DC inputs may be accommodated by the monitor of the present invention and that four such inputs have been illustrated in the figure purely as an illustrative embodiment. The circuitry requires the switching transistor Q1 to which the switching voltage is applied and this transistor Q1 may be cascaded in circuit with any predetermined number of succeeding transistors each of which is associated with a monitored input line.

The manner in which square wave collector voltage at terminal 24 is utilized in an output current to develop a failsafe DC output indication for a valid condition is, as functionally depicted in the figure, that of providing DC level shifting operations on the square wave output at terminal 24 including an amplification function operating from a negative supply source. The output from the amplification stage is level shifted again and rectified in such a manner as to provide a discrete position DC output level for a valid condition and a negative output level under conditions of monitor circuit failures or invalid monitor inputs.

The output circuitry which responds to the voltage on the collector of transistor Q5 in the switching chain is, in effect, a failsafe generator which utilizes a negative voltage supply to generate a positive output for valid condition. Generally the output circuitry might be defined as means for shifting the DC level of the waveform on the collector of transistor Q5 to develop a pulsating signal varying between common ground potential and some predetermined negative potential—that is shifting the DC level of the Q5 collector voltage such that its average value is a predetermined negative DC potential and the waveform varies between common ground or zero potential and a predetermined negative potential. This waveform may then be further DC level shifted and applied to a rectifying means to provide a pulsating DC output, positive going, in response to a valid condition. Failsafeness is incorporated in such an output means since a failure in the level shifting device or means by which the Q5 collector waveform is converted to a negative going waveform will result in a negative output which is defined as being an invalid output.

With reference to FIG. 1, the collector element of transistor Q5 is applied through a capacitor 25 to an operational amplifier 26. The operational amplifier might be a commercially available type LM-101A combined in circuit with a negative voltage supply 27 and necessary biasing networks generally designated by reference numeral 33. The operational amplifier might be any one of a number of specific designs. As depicted in the figure, for the purpose of this invention, the operational amplifier comprises an output stage in the form of a PNP-type transistor the collector of which is connected to the negative voltage supply 27. With this type of amplifier, should the output transistor generally designated by reference numeral 36 in the figure be conductive, the output of the amplifier 26 is some negative potential of predetermined lesser magnitude than the negative supply source 27 depending upon the particular load resistors incorporated in the application stage. When the output transistor of the operational amplifier 26 is rendered nonconductive, the output from the amplifier is essentially at, or tends to rise to, the negative potential defined by the voltage source 27. Thus the output from the amplifier 26 is negative going waveform. This output is again level shifted through capacitor 29 and applied to signal rectifying means including a first diode 30 connected to common ground 28. The negative going square wave generated by operational amplifier 26 under valid conditions is level shifted through capacitor 29 and rectified by diode 32 to provide a pulsating positive going output at terminal 32. Failure in the operational amplifier 26 will cause capacitor C2 to charge towards the negative supply voltage source 27. The output on terminal 32 will be a negative potential and thus an invalid indication.

In the absence of a pulsating waveform on the collector of transistor Q5 in the switching chain, the output from the operational amplifier 26 will be a negative voltage to provide a negative output on terminal 32 to indicate invalidity. Incorporation of operational amplifier 26, therefore, provides a convenient means for level shifting the pulsating waveform on the Q5 collector and provides a measure of gain. The invention is not to be limited to the incorporation of an operational amplifier since other expedients might be employed such as various transformer and diode implementations which would be passive in nature rather than active and which would be responsive to generate a particular pulsating positive going output waveform only in response to a pulsating waveform on the Q5 collector electrode.

The present invention thus provides a means for monitoring an arbitrary plurality of input lines and providing a logically invalid output indication should any one of the input lines exhibit a potential beneath a predetermined threshold voltage and should any of the circuit components employed in the monitor exhibit an operational failure.

Although this invention has been described with respect to a particular embodiment thereof, it is not to be so limited as changes might be made therein which fall within the scope of the invention as defined in the appended claims.

I claim:

1. A signal monitoring circuitry comprising a plurality of input signal lines, a source of alternating potential switching signal, signal translating means, each of said input lines and said switching signal being connected to said signal translating means, said signal translating means generating an output signal varying between first and second predetermined potentials at a rate defined by said AC switching signal when all of said plurality of said input lines exhibit a potential above a predetermined threshold voltage, an output means responsive only to a varying level output signal from said signal translating means to provide an output of predetermined potential, said predetermined potential being indicative of a logically valid condition of each of said monitored input lines, said output means comprising means for shifting the DC level of the signal developed by said signal translating means to a predetermined negative potential to develop an output waveform periodically varying between 0 volts and a predetermined negative potential, means for capacitively coupling said DC level shifted signal to voltage rectifying means, the output from said voltage rectifying means comprising a pulsating positive DC voltage in response to a periodically varying voltage being applied to said output means, the output from said rectifying means comprising a negative potential signal in response to the output from said zero translating means exhibiting a static or fixed potential voltage level.

2. A monitoring means as defined in claim 1 wherein said output means comprises an operational amplifier including an output amplifying stage connected in circuit with a negative supply voltage source whereby the output from said amplifier comprises said DC level shifted signal, the output of said amplifier being applied through said capacitive coupling means to said voltage rectifying means.

3. A monitoring device as defied in claim 2 wherein said negative supply voltage is referenced to common ground, said rectifying means comprising a first unilateral conduction device the cathode electrode of which is connected to said capacitive coupling means and the anode electrode of which is connected to said common ground, and a second unilateral conduction device the anode electrode of which is connected to the output of said capacitive coupling means and the cathode electrode of which is connected to an output terminal, said monitoring output signal comprising the potential between said output signal and said common ground.

4. A signal monitoring means comprising a plurality of input signal sources each of which is defined as being valid when it exhibits a DC voltage potential in excess of a predetermined threshold value, a plurality of transistor switching elements each of which is operatively associated with an individual one of said plurality of input signals, each of said plurality of transistor switching elements having a base electrode connected to an associated one of said input lines and a collector element connected to the base element of a succeeding one of said transistor elements, said plurality of transistor switching elements comprising an output transistor switching element the base of which is connected to a last one of said monitored input lines and the collector element of which is connected to a supply voltage source, the emitter elements of each said plurality of switching transistors being connected to a source of threshold voltage, a further control switching transistor member the collector of which is connected to the base element of a first one of said plurality of transistor switching elements, the emitter of said further switching element connected to said source of threshold voltage, a source of switching voltage varying between first ans second predetermined levels being applied to the base electrode of said further transistor switching means, said switching voltage source being effective to render said further transistor switching element periodically conductive at a predetermined rate when said first input monitored signal exhibits a voltage in excess of said threshold voltage, each of said plurality of transistor switching elements being rendered conductive when the associated one of said monitored input lines as applied to the transistor base element and the succeeding one of said input lines as applied to the transistor collector element exhibit a potential in excess of said threshold voltage, whereby the collector potential of said last one of said plurality of said switching elements varies between first and second predetermined levels at a rate defined by the repetition rate of said switching signal source when each one of said plurality of monitored input signals exceeds said threshold voltage and each one of said plurality of switching elements and said further switching element are operational, the collector voltage of said last one of said plurality of switching elements exhibiting a fixed DC potential when any one of said monitored input lines exhibits a potential less than said threshold voltage and additionally in the absence of an AC switching signal of sufficient magnitude to render said further one of said switching elements periodically conductive and additionally upon operational failure of any one of said transistor switching elements; output means connected to the collector element of said last one of said transistor switching elements and responsive to a periodically varying potential thereon to develop an output signal of a first predetermined polarity, said output means being adapted to exhibit an output of opposite polarity in response to the collector voltage of said last one of said transistors switching exhibiting a fixed potential.

5. A monitoring means as defined in claim 4 wherein said output means comprises means for shifting the DC level of the signal developed on collector electrode of said last one of said transistor switching elements to a predetermined negative potential to develop an output waveform periodically varying between substantially 0 volts and a predetermined negative potential and means for capacitively coupling said DC level shifted signal to voltage rectifying means, the output from said voltage rectifying means comprising a pulsating positive DC voltage in response to a periodically varying voltage being applied to said output means, the output from said rectifying means comprising a negative potential signal in response to the input to said output means exhibiting a static voltage level.

6. A monitoring means as defined in claim 5 wherein said output means comprises an operational amplifier including an output amplifying stage connected in circuit with a negative supply voltage source whereby the output from said amplifier comprises said DC level shifted signal, the output of said amplifier applied to said capacitive coupling means.

7. A monitoring device as defined in claim 6 wherein said negative supply voltage is referenced to common ground, said rectifying means comprising a first unilateral conduction device the cathode electrode of which is connected to said capacitive coupling means and the anode electrode of which is connected to said common ground, and a second unilateral conduction device the anode electrode of which is connected to the output of said capacitive coupling means and the cathode electrode of which is connected to an output terminal, said monitoring output signal comprising the potential between said DC output signal and said common ground.

8. A signal monitoring circuitry comprising a plurality of input signal lines each exhibiting a potential to be monitored, a source of alternating potential switching signal, signal translating means, said signal translating means comprising a plurality of transistor switching means, said switching signal applied to the base of a first one of said switching means whereby said first switching means is rendered periodically conductive at a predetermined rate, each of said potential monitored input lines being individually applied to furnish an operational supply voltage in excess of a predetermined threshold to the base of an associated one of said transistor switching means, the emitter electrodes of each of said switching means being connected to a source of threshold voltage, means interconnecting the collector electrode of each of said transistor switching means with the base electrode of a succeeding one of said switching means whereby each of said transistor switching means when conductive effects a short of the base drive to a succeeding one of said transistor switching means, the output electrode of the last one of said transistor switching mean thereby exhibiting a varying DC potential between first and second predetermined voltage levels only when all of said transistor switching means are operable and all of said monitored input lines exhibit a potential in excess of said predetermined threshold, the output from said last one of said switching means being fixed at a predetermined voltage potential when any one of said transistor switching means fails operationally and additionally when any one of said monitored input lines exhibits a potential beneath said threshold potential, and an output means connected to the output electrode of said last one of said transistor switching means and responsive only to a level varying output from said last one of said switching means to provide an output of predetermined potential, said predetermined potential being indicative of a logically valid condition of each of said monitored input lines.

9. A monitoring means as defined in claim 8 wherein said output means comprises means for shifting the DC level of the signal developed on collector electrode of said last one of said transistor switching elements to a predetermined negative potential to develop an output waveform periodically varying between 0 volts and a predetermined negative potential and means for capacitively coupling said DC level shifted signal to voltage rectifying means, the output from said voltage rectifying means comprising a pulsating positive DC voltage in response to a periodically varying voltage being applied to said output means, the output from said rectifying means comprising a negative potential signal in response to the input to said output means exhibiting a static voltage level.

10. A monitoring means as defined in claim 9 wherein said output means comprises an operational amplifier including an output amplifying stage connected in circuit with a negative supply voltage source whereby the output from said amplifier comprises said DC level shifted signal, the output of said amplifier being applied through said capacitive coupling means to said voltage rectifying means.

11. A monitoring means as defined in claim 10 wherein said negative supply voltage is referenced to common ground, said rectifying means comprising a first unilateral conduction device the cathode electrode of which is connected to said capacitive coupling means and the anode electrode of which is connected to said common ground, and a second unilateral conduction device the anode electrode of which is connected to the output of said capacitive coupling means and the cathode electrode of which is connected to an output terminal, said monitoring output signal comprising the potential between said DC output signal and said common ground.

UNITED STATES PATENT OFFICE
CERTIFICATE OF CORRECTION

Patent No. 3,614,591          Dated  October 19, 1971

Inventor(s)  James L. Brown

It is certified that error appears in the above-identified patent and that said Letters Patent are hereby corrected as shown below:

Column 1, line 26, delete "be" and substitute therefor --by--;
Column 5, line 68, after "is" insert --a--; line 70, after "to" insert --output terminal 32 and a second diode 31 connected to--;  Column 7, line 21, delete "ans" and substitute therefor --and--;  Column 8, line 29, delete "mean" and substitute therefor --means--.

Signed and sealed this 11th day of April 1972.

(SEAL)
Attest:

EDWARD M. FLETCHER, JR.            ROBERT GOTTSCHALK
Attesting Officer                  Commissioner of Patents